United States Patent
Tucker et al.

(10) Patent No.: US 10,719,375 B2
(45) Date of Patent: Jul. 21, 2020

(54) SYSTEMS AND METHOD FOR EVENT PARSING

(71) Applicant: ServiceNow, Inc., Santa Clara, CA (US)

(72) Inventors: Stephen Tucker, Kirkland, WA (US); Qingbin Li, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 77 days.

(21) Appl. No.: 15/920,071

(22) Filed: Mar. 13, 2018

(65) Prior Publication Data

US 2019/0286500 A1     Sep. 19, 2019

(51) Int. Cl.
    *G06F 9/54*      (2006.01)
    *H04L 12/26*    (2006.01)
    *G06F 16/28*    (2019.01)
    *G06F 16/901*   (2019.01)

(52) U.S. Cl.
    CPC .............. *G06F 9/542* (2013.01); *G06F 9/547* (2013.01); *G06F 16/285* (2019.01); *G06F 16/9024* (2019.01); *H04L 43/045* (2013.01)

(58) Field of Classification Search
None
See application file for complete search history.

(56) References Cited

U.S. PATENT DOCUMENTS

| | | | |
|---|---|---|---|
| 6,609,122 B1 | 8/2003 | Ensor | |
| 6,609,205 B1 * | 8/2003 | Bernhard | ................. H04L 43/00 726/22 |
| 7,028,301 B2 | 4/2006 | Ding et al. | |
| 7,062,683 B2 | 6/2006 | Warpenburg et al. | |
| 7,131,037 B1 | 10/2006 | LeFaive et al. | |
| 7,170,864 B2 | 1/2007 | Matharu | |
| 7,610,512 B2 | 10/2009 | Gerber | |
| 7,617,073 B2 | 11/2009 | Trinon et al. | |
| 7,668,942 B2 | 2/2010 | Tiwari et al. | |
| 7,689,628 B2 | 3/2010 | Garg et al. | |
| 7,783,744 B2 | 8/2010 | Garg et al. | |
| 7,890,802 B2 | 2/2011 | Gerber | |
| 7,930,396 B2 | 4/2011 | Trinon et al. | |
| 7,945,860 B2 | 5/2011 | Vambenepe et al. | |
| 7,966,398 B2 | 6/2011 | Wiles, Jr. | |
| 8,051,164 B2 | 11/2011 | De Peuter et al. | |
| 8,224,683 B2 | 7/2012 | Manos | |
| 8,266,096 B2 | 9/2012 | Navarrete et al. | |
| 8,457,928 B2 | 6/2013 | Dang et al. | |
| 8,478,569 B2 | 7/2013 | Scarpelli et al. | |
| 8,674,992 B2 | 3/2014 | Poston et al. | |
| 8,689,241 B2 | 4/2014 | Naik et al. | |

(Continued)

*Primary Examiner* — Umut Onat

(74) *Attorney, Agent, or Firm* — Fletcher Yoder PC

(57) ABSTRACT

A system includes a non-transitory memory and a hardware processors configured to perform operations including receiving a plurality of events from one or more network monitoring systems, wherein each event includes a message output by a network monitoring system communicating a status of a network resource connected to a network, clustering similar events into one or more event clusters, extracting an event template for each event cluster, extracting a regular expression (regex) for each event cluster, grouping the events into one or more groups of events having the same or similar extracted regexes, and outputting the one or more groups of events.

20 Claims, 6 Drawing Sheets

(56) References Cited

U.S. PATENT DOCUMENTS

| | | |
|---|---|---|
| 8,743,121 B2 | 6/2014 | De Peuter |
| 8,887,133 B2 | 11/2014 | Behnia et al. |
| 9,239,857 B2 | 1/2016 | Trinon et al. |
| 9,535,737 B2 | 1/2017 | Joy |
| 9,563,689 B1 | 2/2017 | Pueyo et al. |
| 9,792,387 B2 | 10/2017 | George et al. |
| 2004/0122823 A1* | 6/2004 | Baffes ................. G06F 16/30 |
| 2013/0124524 A1* | 5/2013 | Anderson ............ G06F 16/285 |
| | | 707/737 |
| 2018/0165173 A1* | 6/2018 | Lin ................... G06F 11/3476 |

\* cited by examiner

SYSTEMS AND METHOD FOR EVENT PARSING

BACKGROUND

This section is intended to introduce the reader to various aspects of art that may be related to aspects of the present disclosure, which are described and/or claimed below. This discussion is believed to be helpful in providing the reader with background information to facilitate a better understanding of the present disclosure. Accordingly, it should be understood that these statements are to be read in this light, and not as admissions of prior art.

Many enterprises around the world build out, maintain, and utilize large, complex computer networks to more efficiently conduct operations. However, though these complex computer networks may help to improve efficiency, enterprises utilize considerable resources to keep these networks operating smoothly. For example, a network may be outfitted with one or more network monitoring systems that may assist an information technology (IT) service team to evaluate the performance of the network. The network monitoring systems may generate events and/or alerts for the IT service team to review, directing the attention of the IT service team to possible issues the network may be experiencing. The network monitoring systems of large networks may generate hundreds, thousands, tens of thousands, or even hundreds of thousands of events per day. For the IT service team to review all of the events generated and determine the importance of each event may utilize an unreasonably large amount of resources.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, store, and distribute information. External network performance monitors may be used to monitor the performance and/or status of resources connected to the network. For large, complex network, such monitoring devices may generate hundreds, thousands, tens of thousands, or even hundreds of thousands of events per day. The disclosed techniques provide an automated or semi-automated system for parsing event data generated by external network performance monitors. Specifically, the disclosed techniques utilize algorithms to cluster like events, extract one or more templates from each cluster, extract one or more regular expressions (regexes) from each cluster, group events with similar regexes, and then output data in an easily digestible fashion for a human being to review and decide what, if any, remedial action should be taken. In some embodiments, the system initiates automatic remedial action to resolve some issues.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

Figure 1:
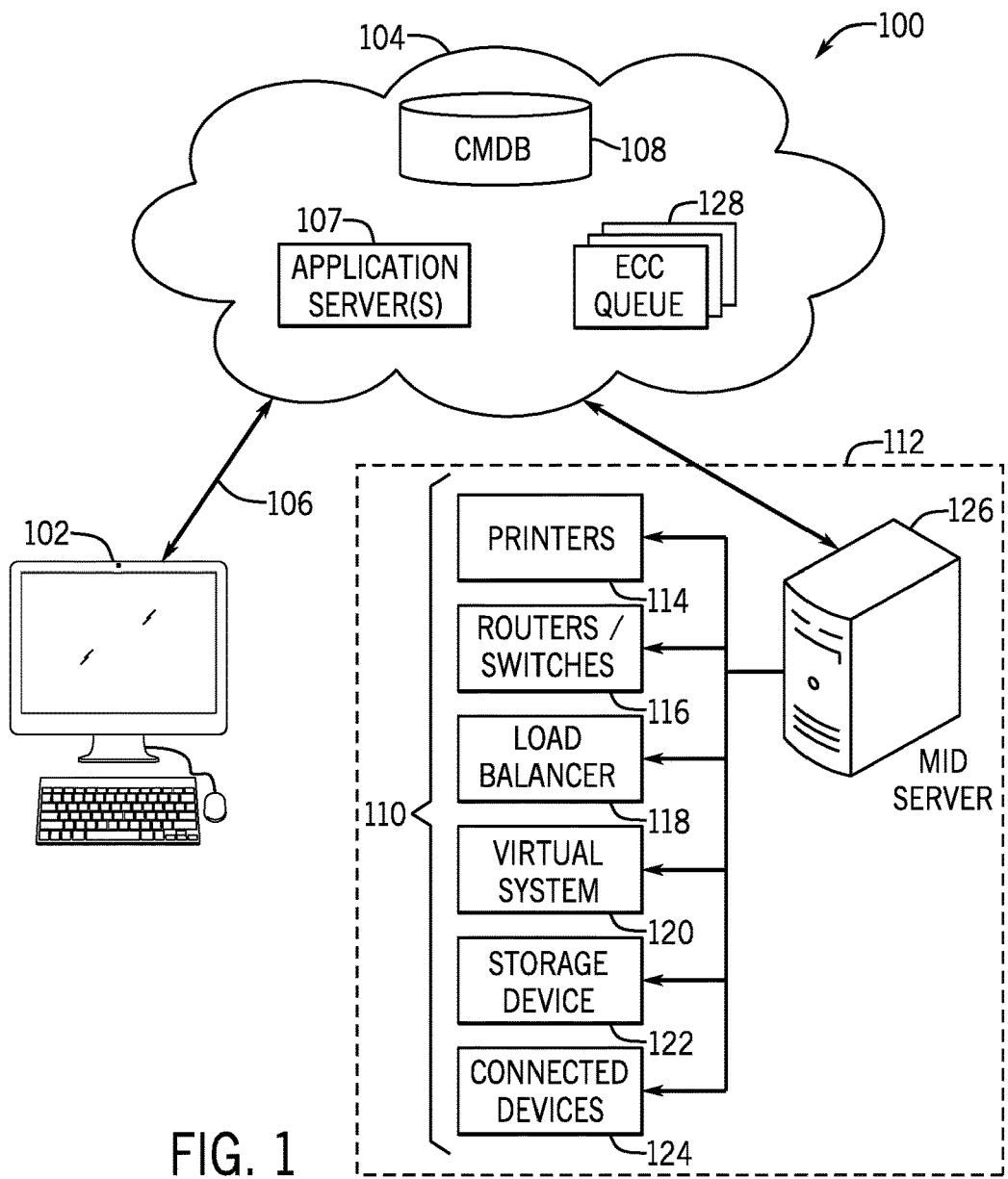
FIG. 1 is a block diagram of a distributed computing system utilizing a cloud service and a configuration management databases (CMDB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in a world in which various electronic devices are interconnected within a distributed context. As more and more functions are performed by services using some form of distributed computing, the complexity of IT network management increases. Network monitoring systems may be deployed within a network to assist an IT service team in evaluating the performance of the network. The network monitoring systems may generate events and/or alerts for the IT service team to review, directing the attention of the IT service team to possible issues the network may be experiencing. The network monitoring systems of large networks may generate hundreds, thousands, tens of thousands, or even hundreds of thousands of events per day. For the IT service team to review all of the events generated and determine the importance of each event may utilize an unreasonably large amount of resources.

A team of IT service professionals capable of parsing event data as it is generated would be quite large. Further, because such a team would involve multiple human beings, each with his or her own approach to parsing and processing the event data, the results would vary from person to person, resulting in inconsistencies. Additionally, human beings reviewing event data typically traverse the event data event-by-event, making a determination for each event whether the event warrants any action and if so, what that action should be taken. Using algorithms to perform automated or semi-automated parsing of event data may reduce the resources allocated to parsing event data. Specifically, algorithms may be utilized to cluster like events, extract one or more templates from each cluster, extract one or more regular expressions (regexes) from each cluster, group events with similar regexes, and then output data in an easily digestible fashion for a human being to review and decide what, if any, remedial action should be taken. In some embodiments, the system initiate automatic remedial action to resolve some issues. Utilizing these techniques may reduce the amount of human resources dedicated to event data parsing, and may result in faster, more efficient, and more accurate event data parsing.

By way of introduction, FIG. 1 is a block diagram of a system 100 that utilizes distributed computing framework, which may perform one or more of the techniques described herein. As illustrated in FIG. 1, a client 102 communicates with a platform 104, e.g., a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs capable of running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together and communicate using one or more networks. For instance, the platform 104 may be a cloud service platform that includes various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionalities, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and enterprise services controlled by a client 102 and the configurations of these assets and services. The assets and services include configuration items (CIs) 110 that may be computers, other devices or hardware on a network 112 (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the platform 104 may include one or more other database servers. The database servers are configured to store, manage, or otherwise provide data for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely, such as at a client site.

In the depicted topology, access to the platform 104 is enabled via a management, instrumentation, and discovery (MID) server 126 via a communication queue 128, such as an External Communications Channel (ECC) Queue. The MID server 126 may include an application program (e.g., JAVA application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

As discussed below, the MID server 126 may periodically and/or intermittently use discovery probes to determine information on devices connected to the network 112 and return the probe results back to the platform 104. Probes may have different types and functions. For example, some probes may identify devices running specific operating systems (e.g., Windows or Linux) while other exploration probes may return disk information for those devices using the operating systems. Some probes run a post-processing script to filter the data that is sent back to the platform 104.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication queue 128 may be a database table that is typically queried, updated, and inserted into by other systems. Each record in the communication queue 128 is a message from an instance in the platform 104 to a system (e.g., MID server 126) external to the platform 104 that connects to the platform 104 or a specific instance running in the platform 104 or a message to the instance from the external system. The fields of a communication queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message.

Although the system 100 is described as having the application servers 107, the CMDB 108, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
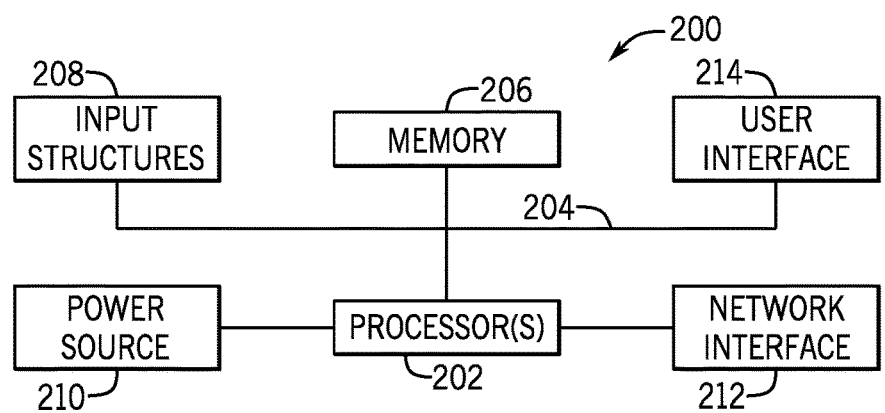
FIG. 2 is a block diagram of a generalized computing device utilized in the distributed computing system of FIG. 1, in accordance with an embodiment.

In any case, to perform one or more of the operations described herein, the client 102, the application server 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the ECC queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other suitable circuitry performing functions by executing instructions stored in the memory 206 or in an otherwise accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units of the same or different types in one or more physical locations. The one or more processor 202 may access data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. In addition and/or alternative to the display, the user interface 214 may include other devices for interfacing with a user. For example, the user interface 214 may include lights (e.g., LEDs), speakers, haptic feedback, and the like.

Figure 3:
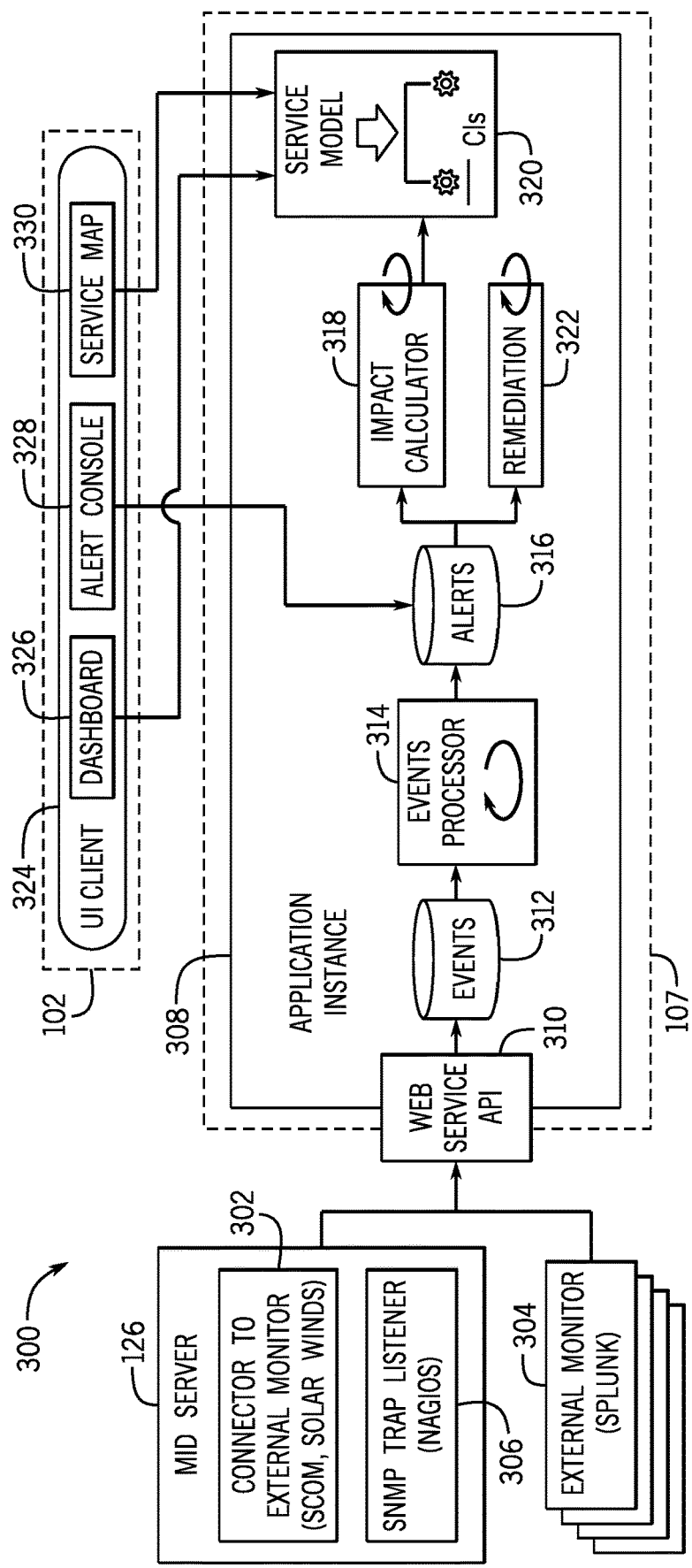
FIG. 3 is a block diagram of a system for network monitoring, in accordance with an embodiment.

FIG. 3 is a block diagram of a system 300 for network monitoring. As shown, the mid server 126 may include a connector 302 for connecting with one or more external monitors 304, as well as a simple network management protocol (SNMP) trap listener 306. The one or more external monitors 304 may be distributed throughout the network and/or coupled to various devices on the network in order to monitor the performance of the various devices, or the network itself. The external monitors 304 may generate events that convey information about the performance of the network or components connected to the network. For example, the events may convey information about the status of one or more components coupled to the network, problems encountered by one or more components coupled to the network, warnings generated by or about one or more components coupled to the network, connections between one or more components coupled to the network, etc. The events may be provided to the MID server 126 via the connector 302, or directly to an application instance 308 running on the application server 107 (e.g., via a web service API 310) for storage in an events database 312. The SNMP trap listener 306 may be configured to listen for or receive traps (i.e., alert messages) sent from remote SNMP-enabled devices. As with the events from external monitors 304, the traps may be provided to the application instance 308 via the MID server 126 and the web service API 310 for storage in the events database 312. Though the illustrated system includes external monitors 304 and an SNMP trap listeners 306, it should be understood that that some embodiments of the system 300 may only have one type of event-generating component, or may have other types of event-generating components.

The web service API 310 pulls or receives event data (e.g., from the external monitors 304, the connector 302, the SNMP trap listener 306, and/or other event data generating components) and passes the event data to the events database 312, where a record may be created for each event. An events processor 314 (e.g., events processing API) may parse the event records in the events database 312 and perform processing, generating records for an alerts database 316 (e.g., when events satisfy certain alert rules). As described in more detail below, event parsing and processing may include combining or grouping coinciding or similar events, determining the seriousness of events, determining the possible effects of events, examining the format and/or structure of event data, etc.

An impact calculator 318 (e.g., impact calculator API) may determine an impact of one or more events stored in the alerts database 316. For example, if a group of multiple components coupled to the network are dependent upon a first component that is experiencing a problem, then the impact of the problem experienced by the first component may not be limited to the first component, but rather may affect the entire group of multiple components. As shown, the impact calculator 318 may reference a service model 320 of the network or a portion of the network in performing its impact calculation. The service model may be, for example, a representation, graphical or otherwise, of the components coupled to the network, or a subset of components coupled to the network and their relationship (e.g., dependencies) to one another. For example, various parent/child and/or dependency relationships between components coupled to the network may be reflected in the service model 320. In some embodiments, the service model 320 may be updated based on the impact calculation performed by the impact calculator 318 to reflect one or more alerts in the alerts database 316 and their respective impact on the network. For example, the service model 320 may indicate when a component is not working, disconnected, not communicating, or otherwise experiencing a problem by, for example, greying out the component, displaying the icon of the component in a given color, flashing the icon, displaying the icon of the component with an indication of a problem, such as a colored stripe, an exclamation point, or some other warning symbol, etc.

A remediation component 322 (e.g., remediation API) may take action to attempt to remedy the problems associated with the alerts in the alerts database 316. For example, the remediation component 322 may create an incident record (e.g., a service ticket) to flag an event as needing inspection by a member of the IT service team. In other embodiments, the remediation component 322 may attempt to take steps to remedy the problem without the intervention of a human being. For example, it may be stored in a knowledge base that one or one or more possible actions may resolve the issue experienced by the component. For example, when a component is experiencing a problem, the remediation component 322 may go through a series of steps (e.g., restart component, update firmware, check network connection, etc.), checking after each step to determine whether the problem has been resolved. If the problem cannot be resolved, the remediation component 322 may bring the problem to the attention of a human being (e.g., an IT service team member) to be examined and addressed.

As illustrated, a user may access the application instance 308 via a user interface client 324 running on a client computing device 102. The user interface client 324 may include, for example, a dashboard 326, an alert console 328, and a service map 330. The dashboard 326 may provide a user with a home screen that provides a general landscape of network performance. For example, the dashboard 326 may include a listing of components coupled to the network (e.g., a list of tiles), along with an easily perceptible (color, icon, flashing, etc.) indication of how the component is performing.

The alert console 328 may include a listing of alerts from the alerts database 316. The alerts console 328 may provide one or more ways for the user to take remedial action to resolve one or more of the alerts and/or request assistance resolving the alerts (e.g., restart component, go to component log, email an IT service team member, request a service appointment, etc.).

The service map 330 may be a graphical representation of the components coupled to the network, or a subset of the components coupled to the network (e.g., as represented by the service model 320). The components may be represented by icons connected by lines that represent connections between components. In some embodiments, component dependencies may be reflected by nested icons, such that only a parent icon is displayed. When the icon representative of the parent component is selected (e.g., clicked on), the icons representative of the one or more child components may be displayed. In some embodiments, the icon may be an avatar reflective of the type of component represented by the icon. Further, the icon or avatar may communicate the status of the representative component by displaying the icon in a specific color, greying out the icon, flashing the icon, or adding an indicator (e.g., stripe of color, exclamation point, or some other symbol, etc.).

Figure 4:
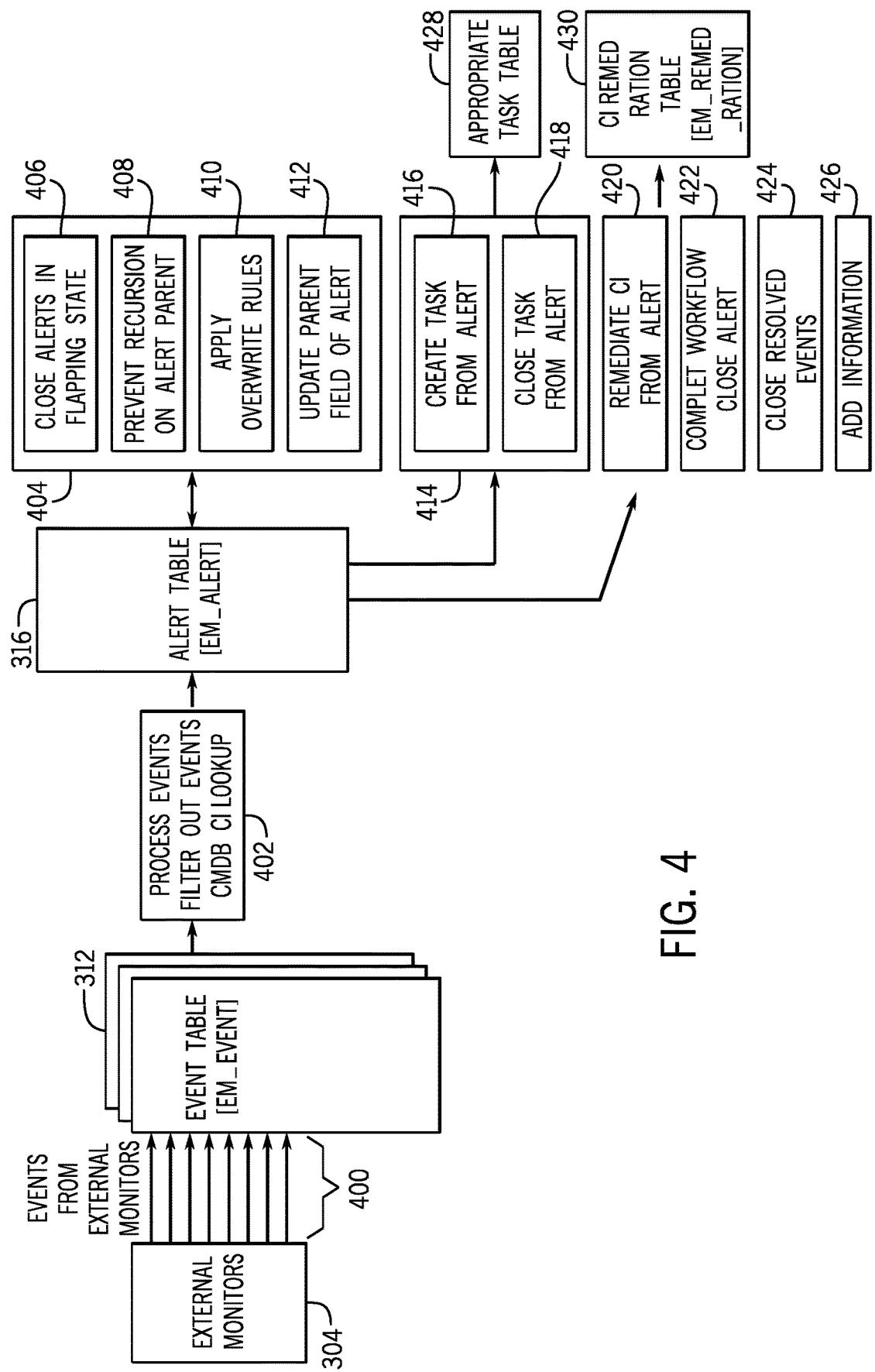
FIG. 4 is a flow chart illustrating how the network monitoring system of FIG. 3 receives and processes event data, in accordance with an embodiment.

FIG. 4 is a flow chart illustrating how the network monitoring system of FIG. 3 receives and processes event data. As previously described with regard to FIG. 3, event data 400 is received (e.g., via the web service API) from one or more external monitors 304 and stored in one or more event tables 312. At block 402, the events are processed (e.g., by the events processor shown in FIG. 3). Processing may include, for example parsing event records in the events database 312, combining or grouping coinciding or similar events, filtering out inconsequential or unimportant events, filtering out events that have been resolved, determining the seriousness of events, determining effects of events, examining the format and/or structure of event data, looking up configuration items (CIs) in a configuration management database (CMDB) corresponding to the components related to the events, etc. The processed event data is then added to the alerts database 316 when events meet certain criteria outlined by alert rules. If an alert does not already exist for an event, a new alert is created. If an alert already exists, the alert is updated with the new event information. As shown in FIG. 4, alerts may be addressed by, for example: acknowledging the alert 404 (close alert in flappable state 406, prevent recursion on alert parent 408, apply overwrite rules 410, update parent field of alert 412), creating a task 414 (create new task 416, such as an incident, a problem, or a change for alert, or choose existing task from alert 418) using automatic remediation 420, performing tasks or remediation activities 422, closing alerts for resolved issues 424, adding additional information 426, such as a knowledge article for future reference, etc. As shown, when a task is created, the appropriate task table 428 may be correspondingly updated. Similarly, when remediation activities are performed, automatic or non-automatic, a CI remediation table 430 may be updated.

Figure 5:
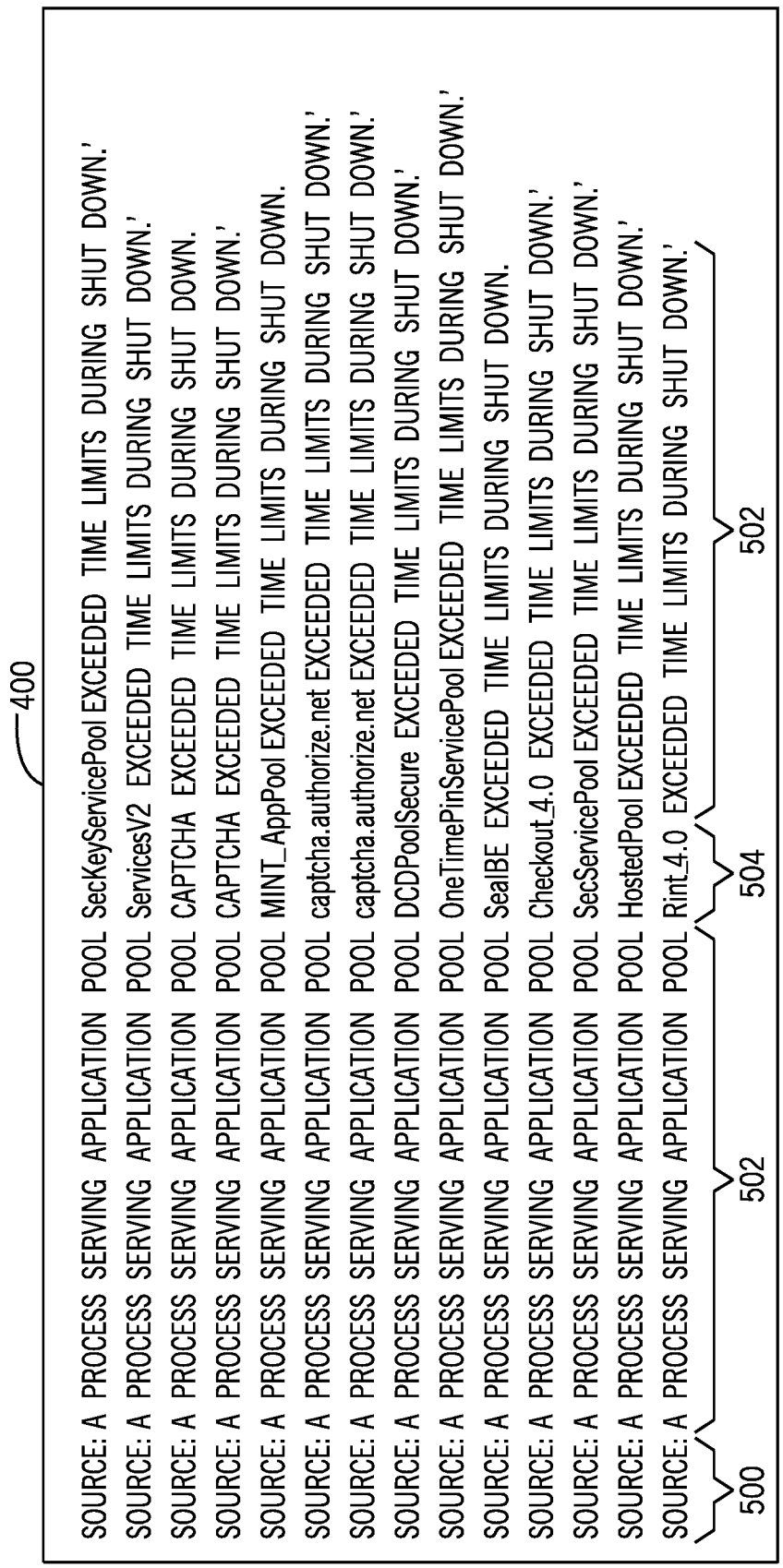
FIG. 5 is a sample of a few lines of event data received from one or more external monitors, in accordance with an embodiment.

Returning to the processing of event data, FIG. 5 is a sample of a few lines of event data 400 received from one or more external monitors. As shown, each line of the event data 400 corresponds to an event. Each line of event data 400 may be broken up into its component parts. The first part of each line is the source 500. In some embodiments, the source may be the external network monitor, an SNMP trap generator, or some other device that generates event data. In some embodiments, the source 500 may be omitted from the event data.

The remainder of each line of event data 400 includes sections of boilerplate language 502 and one or more component names 504. The boiler plate language 502 accords with a template selected based upon what event has occurred. The component name(s) 504 are then inserted in the appropriate place between the portions of boilerplate language 502. For example, each of the events in the event data 400 shown in FIG. 5 correspond to components exceeding time limits during shut down. In each case, the external network monitor, SNMP trap generator, or other device that generates the event data determines that a component has exceeded time limit during shut down, copies the appropriate template (e.g., the template that communicates that a component is exceeding time limits during shut down) from a template directory, table, or database, generates a line of event data that includes the boilerplate language 502 with the component name(s) 504 included in the appropriate place(s), and then outputs the event data (e.g., to the mid server or the web service API).

Though the lines of event data 400 shown in FIG. 5 only include a source 500, a component name 504, and two sections of boiler plate 502, it should be understood that other templates may include places for multiple component names 504, or other fields, such as a time that something occurred, a value (e.g., a time of delay, an error code, etc.) represented by numbers or character strings, etc. As such, it should be understood that the event data 400 shown in FIG. 5 is just an example that that event data may come in a wide variety of formats.

Figure 6:
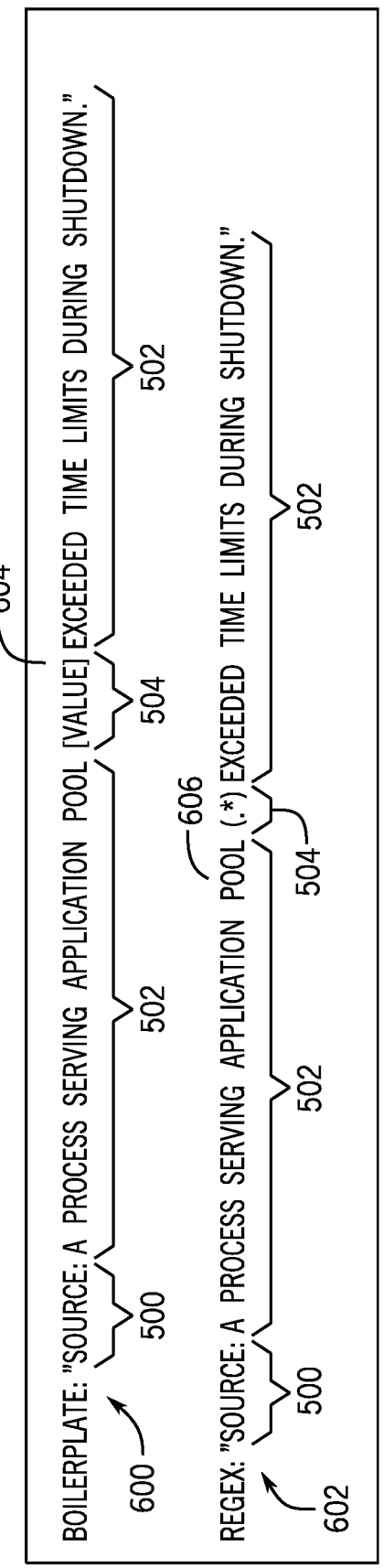
FIG. 6 illustrates templates used in the event data of FIG. 5 in a boilerplate format and a regular expression (regex) format, in accordance with an embodiment.

FIG. 6 illustrates templates used in the event data of FIG. 5 in a boilerplate format 600 and a regular expression (regex) format 602. As illustrated, the boilerplate format template 600 includes a placeholder 604 for the component name 504 that includes the term "value" in brackets. Accordingly, when generating event data using this template, the placeholder 604 is replaced with the character string that is assigned to the variable "value". Similarly, the regex format template 602 also includes a placeholder 606 for the component name, but the placeholder is in regex format (i.e., "(.*)"). Regex is a system for defining a sequence of characters. For example, in the regex system, the parentheses (i.e., "( )") define the marked subexpression, the period (i.e., ".") represents any single character, and the asterisk (i.e., "*") matches the preceding element zero or more times. Thus, the regex of (.*) will match any string. Thus, the boilerplate format template 600 and the regular expression (regex) format template 602 communicate the same thing, but are in different formats.

Returning to FIG. 3, large networks may generate hundreds, thousands, tens of thousands, or even hundreds of thousands of event records in the events database per day.

Accordingly, even a large IT service team of human beings parsing and reviewing event data may not be able to keep up with parsing event data as it is created. Moreover, humans may be prone to emphasizing unimportant events, omitting important events, and/or making mistakes. Further, each person on an IT services team may parse and interpret event data in different ways, resulting in inconsistencies. Partially automating event data processing may reduce the number of human beings on an IT services team used to parse event data and lead to more thorough and precise event data parsing. Specifically, rather than going event-by-event as a human would, the disclosed system may group like events, extract templates and/or regexes, classify events, evaluate the importance of events, etc. for subsequent review my a human being. Deconstructing the event data into the template used to generate the event data and the various placeholders for values embedded in the event data may be helpful in breaking the data down and grouping like events. Accordingly, knowing the templates used and the possible embedded values and what to fields those values correspond (e.g., regexes) may help to improve event data processing. However, if an enterprise deploys network monitoring systems 304 from different vendors or different manufacturers, the events processor 314 may not have a record of templates and regexes being used by the network monitoring systems 304. Further, attempting to keep a record of templates and regexes being used by the network monitoring systems 304 up to date by collecting and storing data from multiple vendors and keeping up with subsequent updates to that data may not be practical. Further, in some cases, a network monitoring system 304 may deviate from its standard templates and create a custom template for an event. Quickly notifying each customer when a custom event template has been created may not be a reasonable expectation of the customer. Accordingly, it may be more efficient to, as a part of event data processing, reverse engineer a record of templates and regexes being used by the network monitoring systems 304 based on the event data received from the various network monitoring systems 304 over time.

Figure 7:
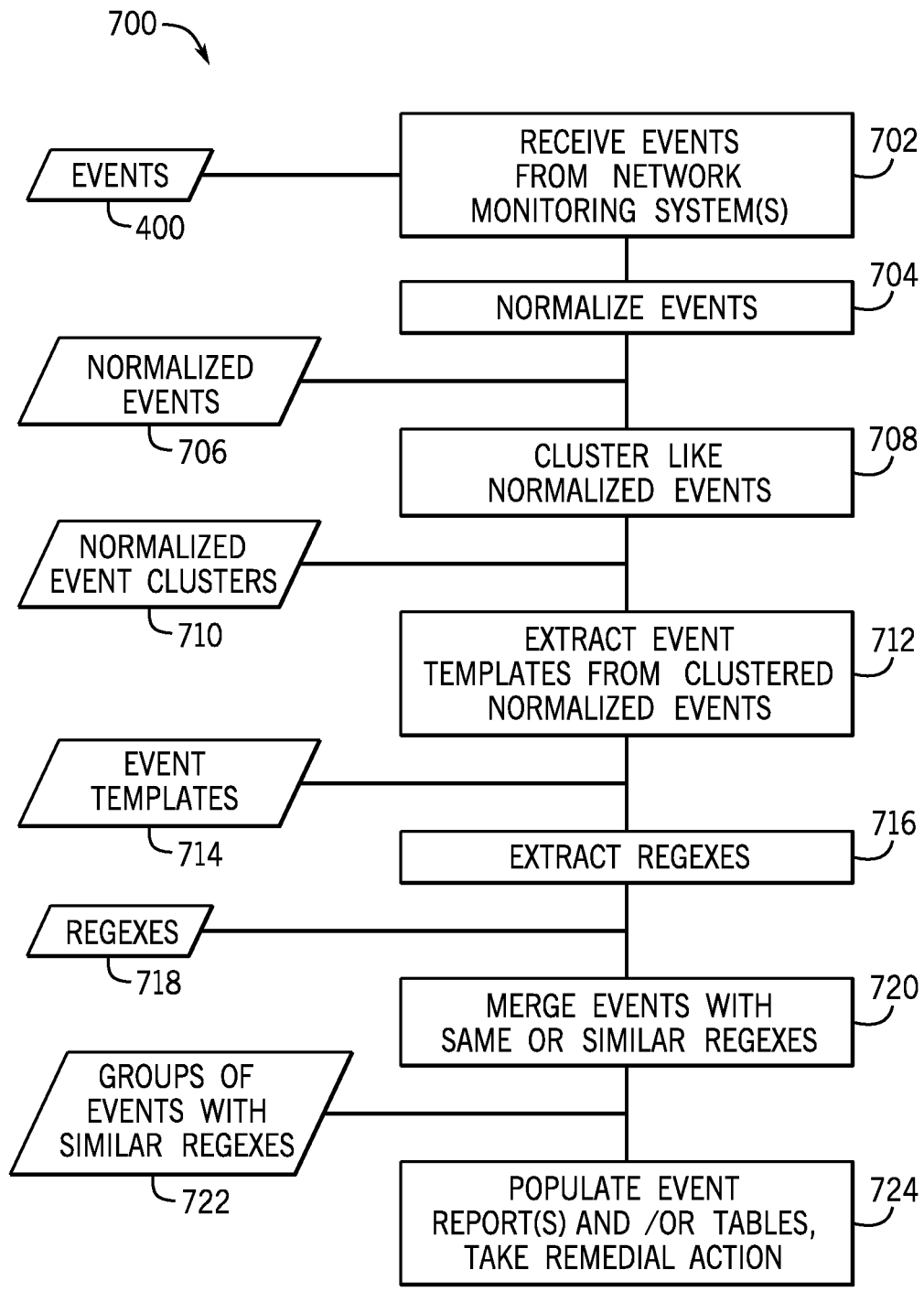
FIG. 7 is a flow chart of a process for parsing event data, in accordance with an embodiment.

FIG. 7 is a flow chart of a process 700 for parsing event data 400. In block 702, event data is received from network monitoring systems or other event generating components via a web service API. Event data 400 may be stored in the events database. The events processor may then pull one or more unprocessed events 400 from the events database for processing. In block 704, the events are normalized, resulting in a group of one or more normalized events 706. Normalizing the events may include, for example, removing punctuation, removing unnecessary characters or words, and generally making small modifications to the event data to get the events into the same or similar formats.

At block 708, similar normalized events 706 are grouped into clusters, creating one or more normalized event clusters 710. Determining similarity of events may be performed via graph-based clustering, doing a similarity calculation, or some other way. Because the underlying events are generated using a finite number of templates, obvious clusters may naturally form.

In graph-based clustering, each event, or portion of an event in a dataset may be graphed as a node according to one or more parameters. The distance between nodes is indicative of how similar the nodes are. Nodes may be grouped into clusters. Distance between clusters indicates how similar the clusters are. Branches may be drawn between nodes and then selectively removed, resulting in one or more clusters of like nodes.

Event clustering via similarity calculation may include, for example, directly calculating the similarity among normalized events based on characters, or using some similarity metric, such as Levenshtein distance, Hamming distance, Jaro-Winkler distance, Sorensen-Dice coefficient, block distance, simple matching coefficient, Jaccard similarity, Tversky index, Overlap coefficient, variational distance, Hellinger distance, informational radius, skew divergence, confusion probability, tau metric, Fellegi and Sunters metric, or some other metric for determining the similarity between character strings.

At block 712, event templates 714 are extracted from the clustered normalized events 710. In some embodiments, a single template may be extracted from each cluster because a single template was used to generate all of the events in a cluster. In other embodiments, multiple similar templates may be extracted from each cluster because several similar templates were used to generate the events in the cluster. Each template may include one or more sections of boilerplate language with placeholders for numeric values or character strings. For example, the template for the event data shown in FIGS. 5 and 6 may be "Source: A process serving application pool exceeded time limits during shut down." The extracted templates 714 may be stored in a table, database, or some other log of event templates used.

At block 716, regexes 718 are extracted for each cluster of normalized events 710. As previously described, each regex is a group of characters that define a search pattern. Because all of the events in a cluster of normalized events utilize the same or similar templates, the values or character strings inserted into the template for each event can be evaluated and a regex can be generated that, if searched, would return the inserted character strings. The extracted regexes 718 may be stored in a table, database, or some other log of regexes used. At block 720, events with the same or similar regexes are merged to create groups of events with similar regexes 722.

As previously discussed with regard to FIGS. 3 and 4, once event data has been processed, the alert database may be filled or updated, alerts may be grouped and analyzed to determine their impact, and remedial action may be taken.

The disclosed techniques provide an automated or semi-automated system for parsing event data generated by external network performance monitors connected to a network of computing devices. For large, complex networks, such monitoring devices may generate hundreds, thousands, tens of thousands, or even hundreds of thousands of events per day. A team of IT service professionals capable of parsing event data as it is generated would be quite large. Further, because such a team would involve multiple human beings, each with their own approach to parsing and processing the event data, the results would vary from person to person, resulting in inconsistencies. Additionally, human beings reviewing event data typically traverse the event data event-by-event, making a determination for each event about whether the event warrants any action and if so, what that action should be taken. In contrast, the disclosed techniques utilize algorithms to cluster like events, extract one or more templates from each cluster, extract one or more regular expressions (regexes) from each cluster, group events with similar regexes, and then output data in an easily digestible fashion for a human being to review and decide what, if any, remedial action should be taken. In some embodiments, the system initiate automatic remedial action to resolve some issues. Utilizing these techniques may reduce the amount of human resources dedicated to event data parsing, and may result in faster, more efficient, and more accurate event data parsing. More accurate event data parsing may in turn lead to fewer and shorter periods of network downtime, and more efficient allocation of IT resources.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a non-transitory memory; and
   one or more hardware processors configured to read instructions from the non-transitory memory to perform operations comprising:
      receiving a plurality of events from one or more network monitoring systems, wherein each event of the plurality of events comprises a message output by a network monitoring system of the one or more network monitoring systems that communicates a status of a network resource connected to a network;
      normalizing the plurality of events comprising removing punctuation, unnecessary words or characters, or both, from the plurality of events to generate a plurality of normalized events;
      clustering similar events of the plurality of normalized events into one or more normalized event clusters;
      after clustering the similar events into the one or more normalized event clusters:
         extracting an event template for each of the one or more normalized event clusters, wherein the event template comprises boiler plate language included in the message of one or more of the similar events and a placeholder for a character string; and
         extracting a regular expression (regex) for each of the one or more normalized event clusters that, when searched, returns the character string;
      automatically grouping the plurality of events into one or more groups of events, wherein each group of events comprises one or more events of the plurality of events having identical extracted regexes or similar extracted regexes; and
      outputting the one or more groups of events.

2. The system of claim 1, wherein the operations comprise retrieving the plurality of events from an events database.

3. The system of claim 1, wherein clustering similar events of the plurality of normalized events into the one or more normalized event clusters comprises graph-based clustering of the plurality of normalized events.

4. The system of claim 3, wherein graph-based clustering of the plurality of normalized events comprises:
   generating a node for each event of the plurality of normalized events;
   graphing each node for each event of the plurality of normalized events, wherein nodes for events having identical event templates or similar event templates form a cluster; and
   connecting two or more of the nodes with branches.

5. The system of claim 1, wherein clustering similar events of the plurality of normalized events into the one or more normalized event clusters comprises performing a similarity calculation.

6. The system of claim 5, wherein performing the similarity calculation comprises calculating a Levenshtein distance.

7. The system of claim 1, wherein the operations comprise populating or updating an alerts database.

8. A system, comprising:
   a plurality of external network monitors, each configured to monitor and to output event data corresponding to performance of one or more resources connected to a network;
   an application server having a memory and a processor configured to execute instructions stored within the memory; and
   an application instance that executes on the application server, wherein the application instance is configured to receive the event data via a web service API, store the event data in an events database, and process the event data stored in the events database, wherein the application instance comprises an events processor configured to:
      retrieve a plurality of events from the event data stored in the events database;
      normalize the plurality of events comprising removing punctuation, unnecessary words or characters, or both, from the plurality of events to generate a plurality of normalized events;
      cluster similar events of the plurality of normalized events into one or more normalized event clusters;
      after clustering the similar events into the one or more normalized event clusters:
         extract an event template for each of the one or more normalized event clusters, wherein the event template comprises boiler plate language included in the event data of one or more of the similar events and a placeholder for a character string; and
         extract a regular expression (regex) for each of the one or more normalized event clusters that, when searched, returns the character string;
      automatically group the plurality of events into one or more groups of events, wherein each group of events comprises one or more events of the plurality of events having identical extracted regexes or similar extracted regexes; and
      output the one or more groups of events to an alerts database.

9. The system of claim 8, wherein clustering similar events of the plurality of normalized events into the one or more normalized event clusters comprises graph-based clustering of the plurality of normalized events.

10. The system of claim 8, wherein clustering similar events of the plurality of normalized events into the one or more normalized event clusters comprises performing a similarity calculation.

11. The system of claim 8, wherein the application instance is configured to determine an impact of one or more alerts stored in the alerts database.

12. The system of claim 8, wherein the application instance is configured to take remedial action to address one or more alerts stored in the alerts database.

13. The system of claim 12, wherein the remedial action comprises creating a task for a member of an information technology service team to address the one or more alerts.

14. The system of claim 8, comprising a user interface client running on a client computing device, wherein the user interface client is configured to provide access to the application instance.

15. The system of claim 14, wherein the user interface client comprises:
- a dashboard configured to communicate the performance of the one or more resources connected to the network;
- an alert console configured to display one or more alerts stored in the alerts database; and
- a service map comprising a graphical representation of the one or more resources connected to the network and one or more relationships between the one or more resources.

16. A method, comprising:
- receiving a plurality of events from one or more network monitoring systems, wherein each event of the plurality of events comprises a message output by a network monitoring system of the one or more network monitoring systems that communicates a status of a network resource connected to a network;
- normalizing the plurality of events comprising removing punctuation, unnecessary words or characters, or both, from the plurality of events to generate a plurality of normalized events;
- clustering similar events of the plurality of normalized events into one or more normalized event clusters;
- after clustering the similar events into the one or more normalized event clusters:
  - extracting an event template for each of the one or more normalized event clusters, wherein the event template comprises boiler plate language included in the message of one or more of the similar events and a placeholder for a character string; and
  - extracting a regular expression (regex) for each of the one or more normalized event clusters that, when searched, returns the character string;
- automatically grouping the plurality of events into one or more groups of events, wherein each group of events comprises one or more events of the plurality of events having identical extracted regexes or similar extracted regexes; and
- outputting the one or more groups of events to an alerts database.

17. The method of claim 16, comprising outputting the event templates to an event template database.

18. The method of claim 16, comprising outputting the identical extracted regexes and the similar extracted regexes to a regex database.

19. The method of claim 16, wherein clustering similar events of the plurality of normalized events into the one or more normalized event clusters comprises graph-based clustering of the plurality of normalized events.

20. The method of claim 16, wherein clustering similar events of the plurality of normalized events into the one or more normalized event clusters comprises performing a similarity calculation.

* * * * *